United States Patent [19]

Barnett, III

[11] Patent Number: 4,989,144
[45] Date of Patent: Jan. 29, 1991

[54] METHOD AND SYSTEM FOR IDENTIFYING AND DISPLAYING DISCREPANCIES IN VEHICLE TITLES

[75] Inventor: Ewin H. Barnett, III, Ashland, Mo.

[73] Assignee: Carfax, Inc., Columbia, Mo.

[21] Appl. No.: 320,231

[22] Filed: Mar. 7, 1989

Related U.S. Application Data

[63] Continuation-in-part of Ser. No. 301,249, Jan. 24, 1989.

[51] Int. Cl.$^5$ .............................................. G06F 15/40
[52] U.S. Cl. .................................... 364/419; 364/409; 364/282.1; 364/920.5; 364/974; 364/200; 364/900

[58] Field of Search ........ 364/419, 409, 200 MS File, 364/900 MS File

*Primary Examiner*—Jerry Smith
*Assistant Examiner*—Steven Kibby
*Attorney, Agent, or Firm*—Webb, Burden, Ziesenheim & Webb

[57] ABSTRACT

A computer method for rapidly identifying and displaying discrepancies in vehicle titles comprises the steps of automatically identifying the discrepancies inherent in individual title transaction records and identifying contextual discrepancies which may be determined by comparison of title transaction records.

17 Claims, 4 Drawing Sheets

METHOD AND SYSTEM FOR IDENTIFYING AND DISPLAYING DISCREPANCIES IN VEHICLE TITLES

RELATED APPLICATIONS

This application is a continuation-in-part of application Ser. No. 301,249, filed Jan. 24, 1989.

BACKGROUND OF THE INVENTION

There exists a large market for used vehicles in the United States. Those trading in used vehicles must establish value of the vehicles and insure against certain problems such as odometer fraud and title washing. It has been estimated that 1 out of 6 vehicles on the road have had the odometer turned back and 1 out of 30 used cars sold has had a salvage title.

One means for insuring against fraud is to examine and compare the public records available in the state title offices. To do so manually would be impractical, however. One would have to correspond with any number of title offices on the chance that a given vehicle had been titled in that office and then carefully study the available records for discrepancies effecting value or suggesting fraud. A used car auctioneer may have only several days in which to prepare for a sale of 50 or more vehicles. The auctioneer or dealer needs immediate access to the public records of the vehicle history presented in a way to immediately alert him to discrepancies. A system for providing such a service can only be practically implemented with high speed computers.

Title washing is the practice of titling a vehicle in one or more states to get a title which has the desired "facts". This takes advantage of the differing regulations and laws in various states pertaining to safety inspections, title branding, out-of-state title holders, mileage verifications, etc. For example, one might purchase a wreck from a junk yard in Missouri. A Missouri salvage title would be issued. If the salvage title were mailed to an accomplice in Arkansas, he could get the vehicle title there with a regular title because Arkansas does not have a salvage title. The vehicle could now be rebuilt and sold anywhere and the purchaser would not know that it had once been a wreck. The purchaser would think the vehicle came from Arkansas. To further cover the tracks, it would be possible to re-title the vehicle in Oklahoma or Texas, for example. This practice is said to be quite common.

Title discrepancies take two forms. One form of title discrepancy can be determined from inspection of a single title transaction record. For example, the record may reveal that the existing title is a salvaged title, a previous salvage title had been issued, or that miles were unknown or not provided at the time of the transaction. Another type of discrepancy is known as contextual discrepancy and can only be determined by studying and comparing the title transaction history. Contextual discrepancy checking permits the discovery of odometer readings which are not reasonable in light of the time lapsed between titles. It further enables the detection of missing titles or possible title washing. It may indicate duplicate titles have been issued where the prior title state is not the same as the state issuing the duplicate title.

All vehicles sold within the United States have a unique vehicle identification (VIN). Every title issued in the United States carries the VIN and, of course, each vehicle has the VIN impressed upon a name plate. The VIN is the key to identifying and tracing the public record of vehicles.

SUMMARY OF THE INVENTION

It is an object, according to this invention, to provide a unique system and method for handling a database of vehicle title transactions indexed by VIN to assist users in rapidly discovering or verifying prior salvage titles, verifying sellers verbal description of the vehicle, making a truer appraisal of the vehicles value, discovering odometer tampering and revealing title washing. It is a further object to provide a unique system and method for handling a database of vehicle title transactions augmented by data supplied by vehicle auctioneers.

It is still a further object, according to this invention, to provide a system and method for handling a database of vehicle title transactions that rapidly and effectively supplies an analysis of static discrepancies and contextual discrepancies.

Briefly, according to this invention, there is provided a computer method for rapidly identifying and displaying discrepancies in vehicle titles. The method comprises gathering recent title transaction data from a plurality of sources indexed by vehicle identification number. The data from different sources have common and different data elements and are organized differently. The next step comprises adding records to a master database having a plurality of standard variable format transaction records indexed by vehicle identification number. When a report is requested, all records indexed by the same vehicle identification number are selected. Discrepancies inherent in the selected transaction records are identified. Contextual discrepancies which may be determined by comparison of transaction records indexed by the same vehicle identification number are identified. Finally, the title transactions and discrepancies, if any, identified in prior steps are displayed.

Preferably, the variable format transaction records are indexed by vehicle identification number and have unvarying fields at least for vehicle identification number, source, odometer reading, title type, and transaction date. The source field is used to identify the structure of the variable portion of the records in the master database.

Preferably, the discrepancies inherent in the individual records are determined at least by the content of the title type field. Preferably, the odometer fields in all records are compared and if an odometer discrepancy is found, an odometer discrepancy is reported. Preferably, a search is made for a duplicate title source discrepancy and if found, a discrepancy is reported. Preferably, a search is made for duplicated titles issued within a preselected period of time prior to the search, and if found, a discrepancy is reported.

Most preferably, transaction records have an unvarying field comprising a status byte, the bits of which are used to store the identification of inherent title discrepancies detected at the time records are added to the master database.

According to the preferred embodiment, a computer method for rapidly identifying and displaying discrepancies in vehicle titles comprising the following steps.

(1) At intervals gathering recent title transaction data from a plurality of sources including state title offices indexed by vehicle identification number.

(2) Adding records to a single master database having a plurality of variable format transaction records indexed by vehicle identification number, and having unvarying fields for vehicle identification number, source, status, odometer reading, title type, and transaction date, the status field comprising a status byte, the bits of which are used to store identification of title discrepancies determinable from the data in the entire record. The bits in the status byte are indicative of at least one inherent discrepancy selected from the group, duplicate title issued, prior duplicate title issued, salvage title issued, prior salvage title issued, miles unknown, and miles not provided.

(3) Identifying the discrepancies inherent in the individual records at least by the content of the title type field at the time of adding records to the master database and setting the status byte accordingly.

(4) Selecting all records indexed by the same vehicle identification number and storing them in a record array and sorting the array by the transaction data field. A formatted record array is constructed from the sorted record array to provide an array of printable transaction records.

(5) Identifying the contextual discrepancies which may be determined by comparison of vehicle records indexed by the same vehicle identification number by comparing each record in the array with the preceding record. A two-byte status word ("discrep_flag") is built, the first byte of the status word being the logical OR of all status bytes in the record array and the second byte of the status word comprising bits which are used to store identification of contextual title discrepancies determined for any record comparison. The bits in the first byte of the status word are indicative of at least one inherent discrepancy selected from the group, duplicate title issued, prior duplicate title issued, salvage title issued, prior salvage title issued, miles unknown, and miles not provided and the bits in the second byte of the status word are indicative of at least one of the contextual discrepancies selected from the group, odometer discrepancy, duplicated title discrepancy and duplicate title within preselected time period. At least one array of status bytes is constructed from the status byte fields ("flag1_array") of the sorted record array and a second status byte ("flag2_array") wherein each bit stores information on contextual discrepancies found by each comparison.

(6) Displaying title transaction and discrepancies, if any. The status word ("descrep_flag") is used to control the display of discrepancy messages being displayed. Each title transaction is printed from the formatted array with an indicia of discrepancy if a discrepancy is indicated by the bits in the at least one array of status bytes ("flag1_array" or "flag2_array").

DESCRIPTION OF THE PREFERRED EMBODIMENTS

Figure 1:
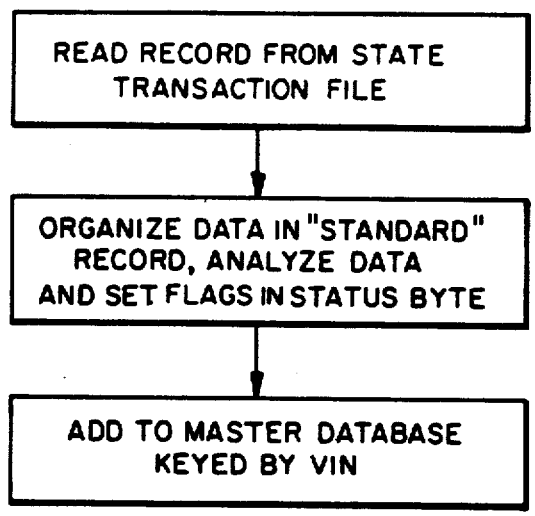
FIG. 1 is a flow diagram of the computer program for gathering-in data according to this invention.

Referring to FIG. 1, since the format of the data received from each state title office differs, a gather-in program reads the data from each state and organizes the data in a "standard record." The standard record has a number of unchanging fields and variable fields, depending upon the data available from the state. Standard records are added to the master database. The definition of the standard record for all states and the definition of the variable portions of the standard record for Indiana, Kansas and Arkansas are set forth in the following Table 1.

TABLE I

```
dcl 1   new_vin_rec     static,
    2   vin_rec_union   union,
        3   vin_rec     char (70),
        3   vin_struc,
            4   t2vin           char(17),        /* 01-17 (17) */
            4   t2tranid        char(3),         /* 18-20 (03) */
            4   t2date          fixed dec(7),    /* 21-24 (04) */
            4   t2titletype     char(1),         /* 25-25 (01) */
            4   t2odo           union,           /* 26-29 (04) */
                5   t2odo_bin   fixed bin(31),
                5   t2odo_dec   fixed dec(7),
            4   t2zip           fixed dec(5),    /* 30-32 (03) */
            4   t2lien          char(1),         /* 33-33 (01) */
            4   t2status        union,           /* 34-34 (01) */
                5   t2status_chr    char(1),
                5   t2status_bit8   bit(8),
                5   t2status_bits,
                    6   t2stat_dup              bit(1),
                    6   t2stat_dupflag          bit(1),
                    6   t2stat_salvage          bit(1),
                    6   t2stat_salvageflag      bit(1),
                    6   t2stat_miles_unknown    bit,
                    6   t2stat_miles_not_provided bit,
                    6   t2stat_new_owner        bit(1),
                    6   t2stat_not_used         bit(1),
            4   t2titleno       char(15),        /* 35-49 (15) */
            4   t2dealer        char(5),         /* 50-54 (05) */
            4   T2_MISC         UNION,           /* 55-70 (16) */
                5   T2MISC          CHAR (16),
                5   T2MISC_ANY,
                    6   T2MISC01    CHAR,
                    6   T2MISC02    CHAR,
                    6   T2MISC03    CHAR,
                    6   T2MISC04    CHAR,
                    6   T2MISC05    CHAR,
                    6   T2MISC06    CHAR,
                    6   T2MISC07    CHAR,
                    6   T2MISC08    CHAR,
                    6   T2MISC09    CHAR,
                    6   T2MISC10    CHAR,
                    6   T2MISC11    CHAR,
                    6   T2MISC12    CHAR,
                    6   T2MISC13    CHAR,
                    6   T2MISC14    CHAR,
                    6   T2MISC15    CHAR,
                    6   T2MISC16    CHAR,
                5   T2MISC_INDIANA,
                    6   T2IN_PREV_STATE     CHAR (2),
                    6   T2IN_NEXT_STATE     CHAR (2),
                    6   T2IN_NEW_USED       CHAR,
                    6   T2IN_MAINT_DATE     FIXED DEC (7),
                    6   T2IN_ASSEMBLED      CHAR,
                    6   T2IN_COURT_ORDER    CHAR,
                    6   T2IN_OUT_OF_COUN-   CHAR,
                        TRY
                    6   T2IN_NOT_USED       CHAR (4),
                5   T2MISC_KANSAS
                    6   T2KS_HWY_STATUS     CHAR (1),
                    6   T2KS_NOT_USED       CHAR (15),
                5   T2misc_Arkansas,
                    6   T2AR_Bit_flags,
                        7   T2AR_New            bit (1),
```

TABLE I-continued

```
        /*True = new*/
    7   T2AR_Instate              bit(1),
        /*True = instate*/
    7   T2AR_Fuel_code bit(3),
        /* Coded with UNSPEC(code)        */
        /* 0  - not used                  */
        /* 1  - Gasoline                  */
        /* 2  - Diesel                    */
        /* 3  - Propane/butane            */
        /* 4  - Electric                  */
    7   T2AR_unused_bits bit(3),
6   T2AR_Vehicle_Type  char(1),
        /* Titled as:                     */
        /* 'C' - City owned               */
        /* 'P' - County owned             */
        /* 'S' - State owned              */
        /* 'D' - Dealer                   */
        /* 'M' - Master dealer            */
        /* 'X' - Taxi                     */
        /* ' ' - Regular (Other)          */
6   T2AR_Surrendered_Title   char (12),
```

The first field ("VIN") in the standard record is the vehicle identification number and thus is the key field upon which data is recalled from the master database. The next field ("transid") identifies the state or other source from which the transaction record was received and controls the variable portion of the record ("misc") at the end of the record. The next fields ("date", "titletype," "odo", "zip" and "lien" contain the date of the transaction, the type of title issued (duplicate, salvage, original etc.), the odometer reading, the zip code of the owner and the number of liens, respectively. The next field "status" is especially important in that it is created by the gather-in program and contains in one byte the information necessary to detect static errors. Bits of this byte are defined as set forth in the following Table II.

TABLE II

| Bit Name | Description |
|---|---|
| Dup | Title was a "duplicate" |
| DupFlag | Some unknown previous title was a "duplicate" |
| Salvage | This is a salvage title. |
| Salvage Flag | Some unknown previous title was salvage. |
| Miles Unknown | Title was marked "TMU". |
| Miles Not Provided | Mileage was not provided. |

The next two constant fields in the record ("titleno", "dealer") hold the number of the title issued and the dealer number of the selling dealer, if known. The variable field ("misc") is available for storing information unique to each different source. Each source has one or more different definitions of this field. In an embodiment of the invention that has been implemented, the entire record is 70 bytes long and the miscellaneous field is 16 bytes long.

A key feature of the system and method being described herein is that data is analyzed by the gathering in program prior to its ever being called for, notwithstanding it may never be called for. The analysis is stored in the status byte.

Salvage titles are issued at the time of a salvage event, such as a collision or fire which requires the vehicle to be either junked or rebuilt. In many states when insurance companies declare a vehicle to be a total loss, a salvage title is issued to the insurer upon settlement of the claim. It should be noted that the theft of an insured vehicle also results in the issuance of a salvage title upon settlement of the claim. A title record may indicate that at some unstated time in the past a salvage title was issued. In states which brand the titles of rebuilt vehicles, each subsequent issued title will carry some indication of the original salvage. If a vehicle's odometer breaks, or is disconnected, or the true and accurate mileage is no longer affirmable by the owner when the vehicle is sold, this information must be disclosed to the buyer. In the car trade, this vehicle is sold "true miles unknown" ("TMU"). If a state issues a title when the owner has not provided the mileage, this is a case of "miles not provided." Miles unknown is a positive affirmation that the mileage is unknown to the seller. Miles not provided is treated by the database solely as the absence of a mileage reading.

Some states have a code in the title data which is set if the vehicle is sold either TMU or not provided. Some states did not collect odometer readings at one time on a required basis or did not supply the database with the odometer readings on some vehicles. These must be treated as miles not provided titles.

When the auctioneer or other dealer makes sales, at their option, the following data is captured in a "auction pool" database: vehicle identification number, sale date, odometer reading, auctioneer identification. The data may be used along with the public records data to provide further information for discrepancy checking. This data is considered of somewhat lower veracity since it is not drawn from sworn public records. Therefore, it is generally only available for use by auctioneers that provide such data.

When a report on a vehicle title history is required, the auctioneer or dealer submits from a remote terminal or modem an individual request or perhaps from a remote computer and modem a batch of requests. A typical report is produced in Table III.

TABLE III

| Date: 10/11/88 | Vehicle Records History Service |
|---|---|
| For: | ACE, INCORPORATED |
| | 1306 Old Hwy 63 South |
| | Columbia, MO |
| Vehicle ID No.: | 1G6CD6984F4256241 |
| Yr/Mfg: | 1985 Cadillac |
| Model: | Deville |
| Body: | 4dr Sedan |

NOTE the following potential problem(s) regarding this records history:
*Odometer reading discrepancy.

| No. | Date | Source | Description |
|---|---|---|---|
| 1 | 02/04/85 | Missouri | Title type issued- Regular |
| | | | Odometer reading- 30 |
| | | | Mileage sworn/affirmed |
| | | | Owner city- LAKE OZARK, MO |
| | | | Purchase status- New instate |
| | | | Title Number - UB521294 |
| 2 | 05/15/85 | Kansas | Title type issued- Regular |
| | | | Odometer reading- 3,316 |
| | | | Owner city- SHAWNEE MISSION, KS |
| 3 | 11/04/86 | Kansas | Title type issued- Regular |
| | | | Odometer reading- 31,439 |
| | | | Owner city- SHAWNEE MISSION, KS |
| | | | Title Number - 19311051 |
| 4 | 09/28/87 | Missouri | Title type issued- Regular |
| | | | Odometer reading- 49,885 |
| | | | Mileage sworn/affirmed |
| | | | Owner city- SEDALIA, MO |
| | | | Purchase status- Used instate |
| | | | First lien at time of title issue |
| | | | Title Number - UC631306 |
| 5 | 08/19/88 | Kansas | Title type issued- Duplicate *** |
| | | | Odometer reading- 31,439 |
| | | | Owner city- SHAWNEE MISSION, |

TABLE III-continued

| Date: 10/11/88 | Vehicle Records History Service |
| --- | --- |
| | KS |
| | Title Number - A0529989 |

The requests for a report at the very least contain the vehicle identification number of the vehicles for which a report is required. The request might also contain the sale date, a discrepancy mask that sets the type of discrepancies the auctioneer or dealer desires to be alerted to, a caution control flag which determines if the report will reflect that the vehicle is identified in a special caution list, a pool control flag that determines if auction pool data will be considered and one or more records of the type in the master database which the requester desires to also be considered and displayed in the report. For example, the state title office might desire to check for discrepancies in the title transaction it is about to issue. The inserted record would be of the form that would be issued by the state and the information therein could be used for contextual discrepancy checking.

Figure 2A:
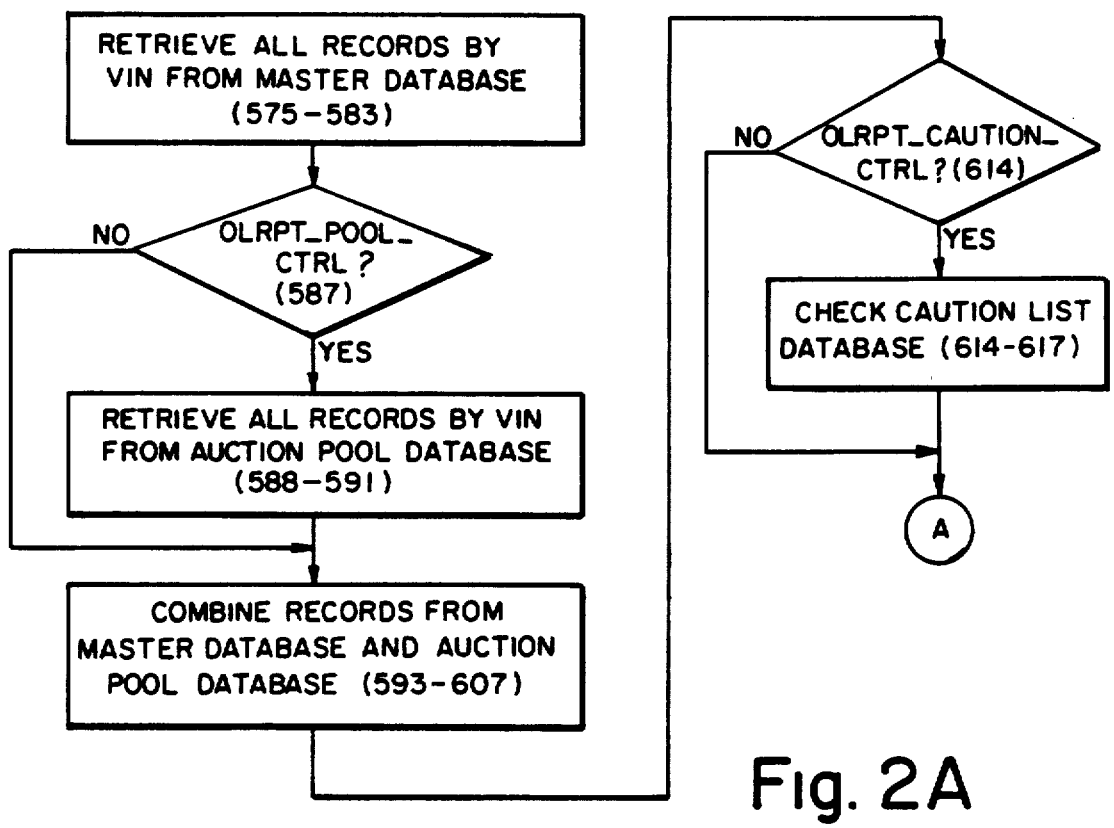
FIGS. 2A, 2B and 2C are flow diagrams for the computer program for report generating according to this invention.
Figure 2B:
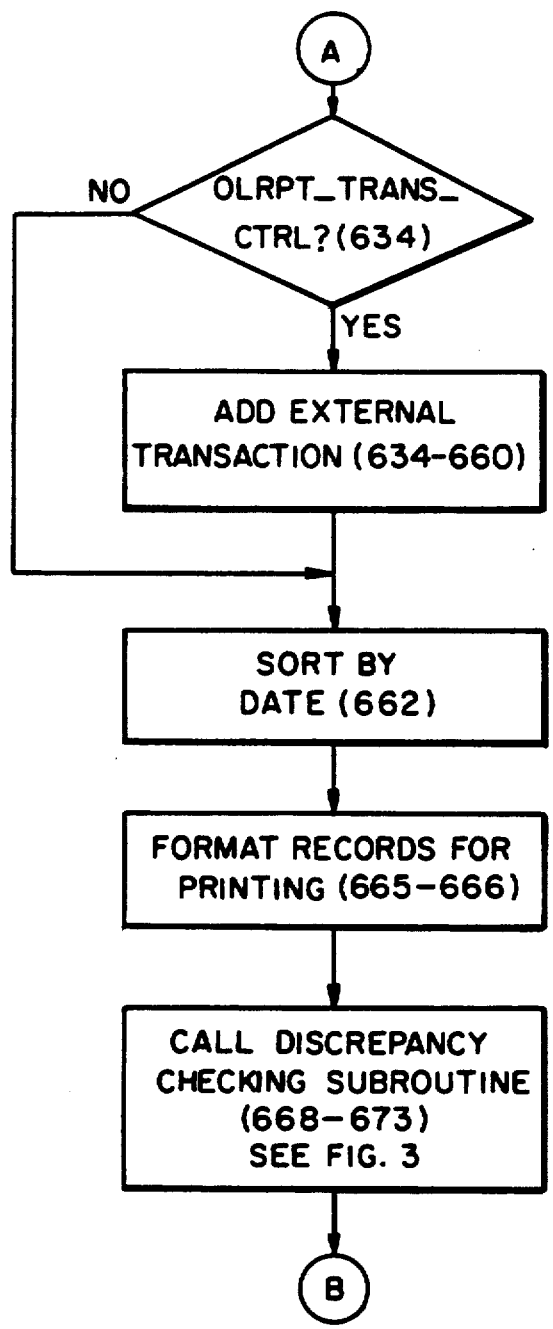
Figure 2C:
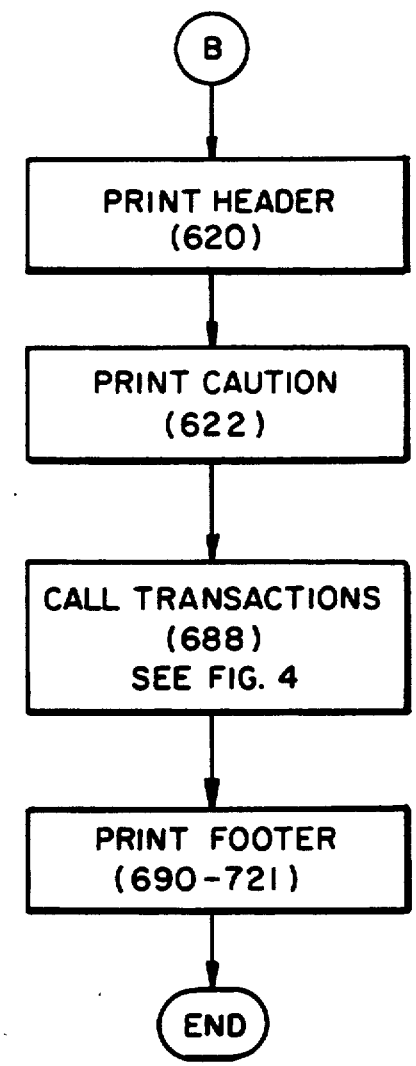

FIGS. 2A, 2B and 2C are a flow diagram of a computer program for generating the report. Appendix A is portions of a source code listing for one implementation of this invention in the PL/1 language. The numbers in the parentheses on the flow diagram correspond to program lines of the source code.

Referring to FIGS. 2A, 2B and 2C, the first step in generating a report is to collect all records in the master database with the same key, that is, the same vehicle identification number and to place them into a raw records array. Next, a check is made to determine if information from the auction pool is desired. If so, all records from the auction pool are added to the raw records array. Finally, a check is made to determine if external records have been supplied by the requester and if so, these are added to the raw records array.

The combined raw records array is then sorted by date and checked for duplicate records. Duplicate records are discarded. The sorted raw records array is then processed into a print array. The print array is a formatted array of the same information contained in the raw records array. The process for forming the print array comprises checking the second field in the raw record ("transid") to decode the miscellaneous field at the end of each record.

Next, the discrepancy check subroutine is called. This subroutine processes the raw record array to produce a 16 byte discrepancy flag ("discrep_flag") that holds an analysis of all records in the records array, a "flag1_array" of the "status" bytes of the record array, and a "flag2_array" of the local discrepancy bits ("odo_discrep", "dup_discrep", "dup_in60"), and a dealer array which is an array of the "dealer" field from the record array. The details of this subroutine are described hereinafter with reference to FIG. 3.

The print header, print caution routine, print transaction routine and print footer routine are next called to produce the desired report. The print transaction step is a subroutine that is described hereinafter with reference to FIG. 4.

Figure 3:
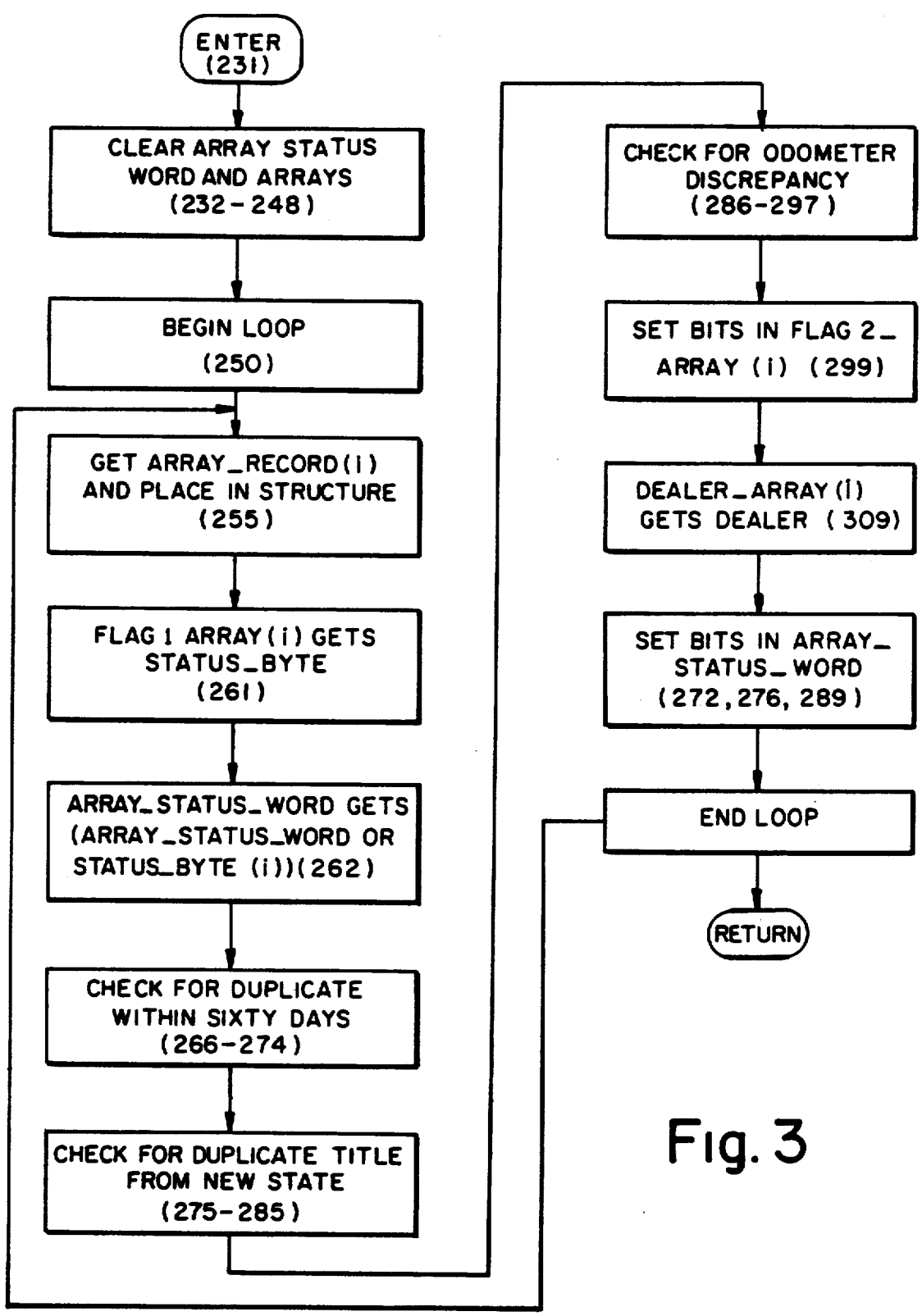
FIG. 3 is a flow diagram for the contextual discrepancy checking subroutine of the program of FIGS. 2A, 2B and 2C.

The discrepancy check subroutine will now be described with reference to FIG. 3. The source code for one implementation of this subroutine is set forth in Appendix B. Upon entering the routine, the array status word is cleared. This is a 16 bit word that keeps track of the type of discrepancies that can be found in any record in the record array and of any contextual discrepancy found by comparing records in the array. The principal purpose of the array status word is to control the display of discrepancy messages when a title report is being transmitted, displayed or printed. One byte of the array status word is comprised of a byte created by a bit by bit logical OR of each status word in the record array. The other byte of the array status word has bits set whenever a contextual discrepancy is detected.

Each record in the raw record array is accessed and placed into a data structure that enables access to individual fields. The status byte of the present record being handled is placed into the flag1_array. One byte of the array status word is ORed with the present record status byte. Next, a check for duplicate titles issued within the last 60 days is made by comparing today's date with the date of any duplicate title transaction. Next, a check is made to see if a duplicate title has been issued in a new state. Finally, a check is made for odometer discrepancies by checking whether the odometer reading has been advanced between transactions. If any of the contextual discrepancies are found, the bits corresponding thereto are set in the array status word and in the corresponding byte in the flag2_array. Finally, the dealer identification of the present record is transferred to the dealer array if all records have not been processed and the subroutine loops back.

Figure 4:
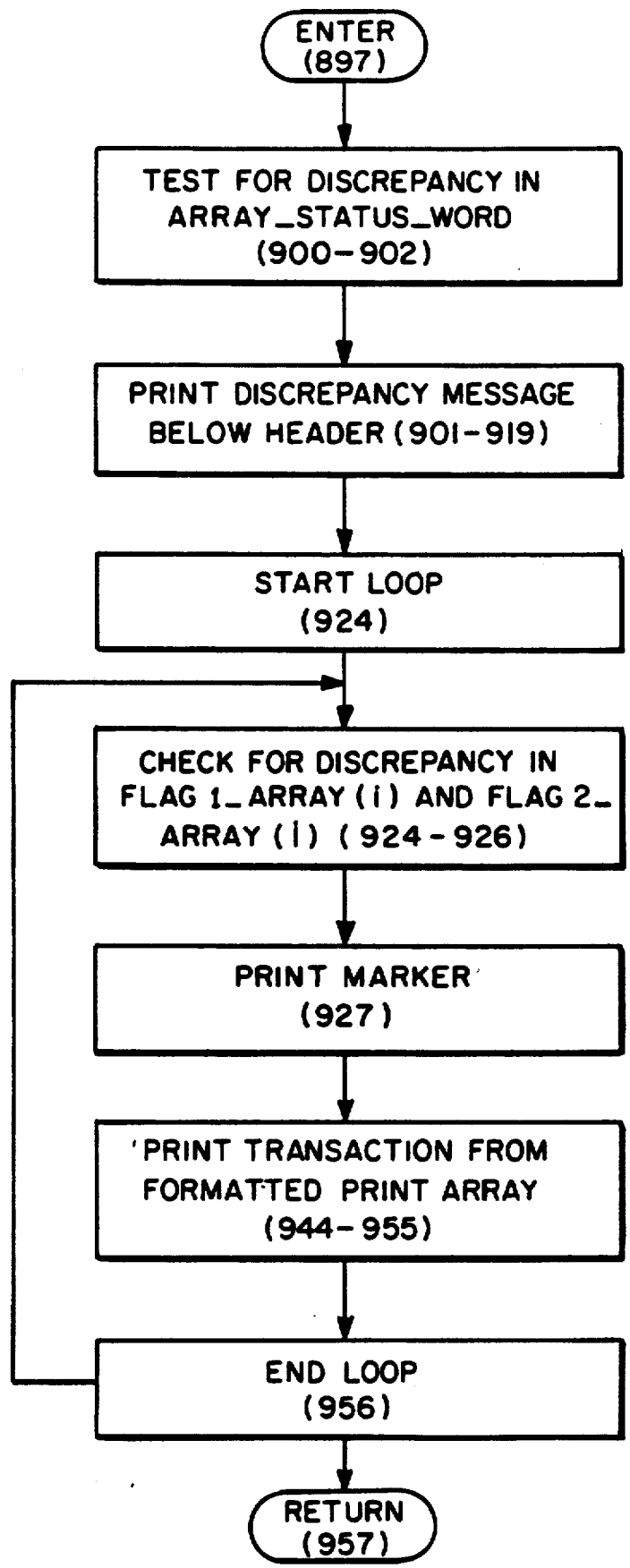
FIG. 4 is a flow diagram for a report printing subroutine of the program of FIGS. 2A, 2B and 2C.

Referring now to FIG. 4, the print report subroutine is described. The source code for one implementation of this subroutine is set forth in Appendix C. The first step is a test for the bit set in the array status word. If bits corresponding to a particular discrepancy are set, a message is printed below the report header corresponding to that discrepancy. Possible messages comprise those set forth in the following Table IV.

TABLE IV

"duplicate title issued"
"salvage or junk title issued"
"title with unknown mileage"
"incomplete mileage history"
"odometer mileage discrepancy"
"duplicate title state and prior title state not the same"
"duplicate title issued within the last two months".

The foregoing is based upon information supplied by sources deemed to be reliable but no responsibility is assumed by reason of errors, inaccuracies or omissions.

```
OLRREPORT_SUB1              APPENDIX A              10-JAN-1989 13:22:47    VAX PL/I  V2.3-367         Page 1
V2.3                                                 5-DEC-1988 09:11:38    USDEV66:[DEV66]OLRREPORT_SUB1.PLI;27 (1)

1      /* OLRREPORT_SUB1 subroutine to create entire report*/
    2
    3      /* Used in:  OLR203      Print VRH report     */
    4      /*           BAT100v02   Print Inventory Reports */
    5      /*           AU120v2     Print auction discrep VRH report */
    6      /*           BIL120v2    Print billing discrep VRH report */
    7      /*           DR200v02    Print load    discrep VRH report */
    8
    9      /* 7/17/88 twin copied w/o changes from OLR202.PLI           */
   10
   11      OLRREPORT_SUB1: PROC(olrpt_vin_in,
   12                           olrpt_today,
   13                           olrpt_days_today,
   14                           olrpt_sale_date,
   15                           olrpt_recs_read,
   16                           olrpt_discrepancy_mask,
   17                           olrpt_missing_control,
   18                           olrpt_caution_control,
   19                           olrpt_pool_control,
   20                           olrpt_rec_array,
   21                           olrpt_text_array,
   22                           olrpt_for_text,
   23                           olrpt_x_tran_control,
   24                           olrpt_x_tran_dup_sap,
   25                           olrpt_x_tran,
   26                           olrpt_report_heading_control,
   27                           olrpt_report_heading1,
   28                           olrpt_report_heading_control2,
   29                           olrpt_report_heading2,
   30                           olrpt_report_heading_control3,
   31                           olrpt_report_heading3,
   32                           olrpt_report_heading_control4,
   33                           olrpt_report_heading4,
   34                           olrpt_trailing_control1,
   35                           olrpt_trailing_text1,
   36                           olrpt_trailing_control2,
   37                           olrpt_trailing_text2,
   38                           olrpt_trailing_control3,
   39                           olrpt_trailing_text3,
   40                           olrpt_trailing_control4,
   41                           olrpt_trailing_text4,
   42                           olrpt_report_page,
   43                           olrpt_report_sypageno,
   44                           olrpt_report_pageno);
   45
   46                  /* Define parms */
   47
   48      dcl olrpt_vin_in           char(17),         /* vin */
   49          olrpt_today            char(6),          /* Char date for report (today) */
   50          olrpt_days_today       fixed bin(31),    /* Today's date in days */
   51          olrpt_sale_date        pic'999999',      /* Report cut-off date in yymmdd */
   52          olrpt_recs_read        fixed bin(15),    /* Output- Number of recs found */
   53          olrpt_discrepancy_mask fixed bin(8),     /* Mask for discrep checker */
   54          olrpt_missing_control  bit(1),           /* If on, then run missing check */
```

```
OLRREPORT_SUB1                          10-JAN-1989 13:22:47   VAX PL/I   V3.3-367      Page 12
V2.3                                     8-DEC-1988 09:11:38   USDEV66:[DEV66]OLRREPORT_SUB1.PLI;27 (1)

575        1    OPEN_PROGRAM:
 576        1        /* READ VINDATA RECORD */
 577        1        NO = 0;                           /* CLEAR COUNTER */
 578        1        do i = 1 to olrpt_recs_read;
 579        2            olrpt_rec_array(i) = ' ';     /* clear prev recs in array */
 580        2        end;
 581        1
 582        1        savevin = olrpt_vin_in;           /* save bcus subr may modify */
 583        1        call readvind(savevin, olrpt_rec_array, date_array, olrpt_recs_read);
 584        1
 585        1        title_recs_read = olrpt_recs_read;
 586        1
 587        1        pool_recs_read = 0;
 588        1        if olrpt_pool_control then do;
 589        2            savevin = olrpt_vin_in;
 590        2            call readpool(savevin, olrpt_sale_date, pool_recs_read, pool_data);
 591        2        end;
 592        1
 593        1        j = 0;
 594        1        do i = (title_recs_read + 1) to (title_recs_read + pool_recs_read); /* move pool */
 595        2            j = j + 1;
 596        2            auction_pool_rec = pool_data(j);   /* from array to structure */
 597        2            vin_rec = copy(' ',70);             /* blank target & move fields*/
 598        2            t2vin = ap_vin;
 599        2            t2odo_dec = ap_odo;
 600        2            t2date = ap_date;
 601        2            t2tranid = 'AUP';
 602        2            t2titletype = ' ';                  /* set unique code */
 603        2            t2misc = ap_source_id;
 604        2            t2status_chr = byte(00);
 605        2            olrpt_rec_array(i) = vin_rec;
 606        2            date_array(i) = ap_date;
 607        2        end;
 608        1
 609        1        olrpt_recs_read = title_recs_read + pool_recs_read;  /* total # recs*/
 610        1        datemmddyy = olrpt_today;           /* setup date to use on report */
 611        1
 612        1        ac_recs_read = 0;                   /* init to 0 for all users for all inq */
 613        1        if olrpt_caution_control then do;   /* Only where account is ok for p */
 614        2            savevin = olrpt_vin_in;
 615        2            call readcaution1(savevin, olrpt_vin_in, ac_recs_read, ac_data);  /* Any Caution list? */
 616        2        end;
 617        1
 618        1        if (olrpt_recs_read > 0) | (ac_recs_read > 0) then  /* if needed */
 619        1            call print_heading;
 620        1
 621        1        if ac_recs_read > 0 then            /* print any caution list entries */
 622        1            call Print_caution;
 623        1
 624        1        if olrpt_recs_read = 0 then         /* if nothing to print, return to caller*/
 625        1            goto exit;
 626        1
 627        1        do i = 1 to olrpt_recs                ;   /* setup sort vector */
 628        1            sort_array(i,1) = i;
 629        2            sort_array(i,2) = date_array(i);
 630        2        end;
 631        2
```

```
OLRREPORT_SUBR1                10-JAN-1989 13:22:47    VAX PL/I  V2.3-367                                Page 13
V2.3                            8-DEC-1988 09:11:38    USDEV66:[DEV66]OLRREPORT_SUBR1.PLI;27 (1)

632   1
633   1  1
634   1  1        if olrpt_x_tran_control then do:     /* insert xtra (auction) data as a non-title*/
635   1  2           vin_rec = olrpt_x_tran;           /* move to get data */
636   1  2
637   1  2           if olrpt_x_tran_dup_sep then do:  /* eliminate dup if found? */
638   1  3              found_dup = false;
639   1  3  check_dup:
640   1  3              do i = 1 to olrpt_recs_read;
641   1  4                 if olrpt_rec_array(i) = vin_rec then do;
642   1  5                    found_dup = true;
643   1  5                    leave check_dup;
644   1  5                 end;
645   1  4              end;
646   1  3              call sort_routine;             /* sort so we can check last rec */
647   1  3              i = sort_vector(olrpt_recs_read);
648   1  3              if (found_dup) & (vin_rec = olrpt_rec_array(i)) then do;  /* Current titleholder*/
649   1  4                 substr(olrpt_rec_array(i),34,1) = byte(00);            /* Current titleholder*/
650   1  4                 goto step3;                 /* knows about prob printed on title*/
651   1  4              end;
652   1  3              if found_dup | (olrpt_recs_read = 50) then  /* safety check */
653   1  3                 goto step3;
654   1  3           end;
655   1  2
656   1  2           olrpt_recs_read = olrpt_recs_read + 1;    /* insert xtra rec */
657   1  2           olrpt_rec_array(olrpt_recs_read) = vin_rec;
658   1  2           sort_array(olrpt_recs_read,1) = olrpt_recs_read;
659   1  2           sort_array(olrpt_recs_read,2) = t2date;
660   1  2        end;
661   1  1
662   1  1        call sort_routine;
663   1  1
664   1  1  step3:
665   1  1        CALL OLRPMT15(olrpt_rec_array, olrpt_recs_read, sort_vector,
666   1  1                      open_flag,print_array);
667   1  1
668   1  1        call discrep_subr2(olrpt_rec_array, olrpt_recs_read, sort_vector, check_array,
669   1  1                      title_array, ds_discrep_flag, discrep_flag1_array,
670   1  1                      discrep_flag2_array, last_title, last_state,
671   1  1                      last_miles, last_date, stop_date, olrpt_days_today,
672   1  1                      ds_idiscrep_flag, ds_dealer_mask, ds_dealer_array,
673   1  1                      ds_salvage_st, ds_odo_st);
674   1  1
675   1  1        missing_flag = false;                 /* clear missing bits before calling subr */
676   1  1        do i = 1 to 50;
677   1  2           missing_array(i) = false;
678   1  2        end;
679   1  1
680   1  1        if olrpt_missing_control then
681   1  1           call missing_titles_subr1(olrpt_rec_array, title_array, olrpt_recs_read,
682   1  1                      sort_vector, missing_array, missing_flag,
683   1  1                      missing_reason1, missing_reason2, missing_reason3);
684   1  1
685   1  1  STEP2: /* format & send remainder of report to user */
686   1  1        NO = olrpt_recs_read;
687   1  1
688   1  1        CALL PRINT_TRANS;     /* PRINT THE STORED FORMATED TRANS */
```

```
OLRREPORT_SUBR1                           10-JAN-1989 13:22:47    VAX PL/I   V2.3-367                    Page 14
V2.3                                       5-DEC-1988 09:11:38    USDEV66:[DEV66]OLRREPORT_SUBR1.PLI;27 (1)

689   1  1
690   1  1               savevin = olrpt_vin_in;
691   1  1                                        /* Look-see for any general notes to print */
692   1  1               call read_general_subr1(savevin, general_recs_read, general_data);
693   1  1
694   1  1               if general_recs_read > 0 then
695   1  1                  call print_general_notes;
696   1  1
697   1  1               if olrpt_trailing_control1 then      /* print any trailing text */
698   1  1                  put skip (2) edit(trim(olrpt_trailing_text1,'.',' ')) (a);
699   1  1               if olrpt_trailing_control2 then
700   1  1                  put skip edit(trim(olrpt_trailing_text2,'.',' ')) (a);
701   1  1               if olrpt_trailing_control3 then
702   1  1                  put skip edit(trim(olrpt_trailing_text3,'.',' ')) (a);
703   1  1               if olrpt_trailing_control4 then
704   1  1                  put skip edit(trim(olrpt_trailing_text4,'.',' ')) (a);
705   1  1
706   1  1          %include '[prodlib]disclaimer.inc';      /* Now print disclaimer */
707   1  1          /* disclaimer.inc - Standard disclaimer
708  =1  1              Used in Olr201, 209, bat100... & sui20     */
709   1  1
710   1  1               put skip(2) edit('The foregoing is based upon information ')
711   1  1                              (a);
712   1  1               put          edit('supplied to Carfax by sources deemed') (a);
713   1  1               put skip(1)  edit('to be reliable but no responsibility is ') (a);
714   1  1               put skip(1)  edit('assumed by Carfax or its agents by') (a);
715   1  1               put skip(1)  edit('reason of errors, inaccuracies or omissions.') (a);
716   1  1
717   1  1               put skip(2) edit(' (C) Copyright 1988, Carfax Inc.') (a);
718   1  1               put         edit(', Columbia, Missouri  (800) 274-2277') (a);
719   1  1
720   1  1          EXIT:
721   1  1          RETURN;
722   1  1          %page;
```

APPENDIX B

```pli
/*  Discrep_subr1.pli    - General purpose discrep check  */
/*  12/01/88  David        Make Ds_last_Miles have a seven-digit */
/*                         pic'9999999' rather than six. */

Discrep_subr1: PROC(ds_rec_array);

dcl ds_rec_array(50) char(70).
      ds_rec_count        fixed bin(15).                /* sorted recs */
      ds_sort_vector(50)  fixed bin(31).                /* count of recs */
      ds_check_array(50)  char(1).                      /* 'T'= use for discrep */
      ds_title_array(50)  char(1).                      /* 'T'= title rec */

1 ds_discrep_flag union.
     3 ds_dflag_bytes.
       5 ds_flag_byte1 char(1).
       5 ds_flag_byte2 char(1).
     3 ds_dflag_byte_bits.
       5 ds_flag_byte1_bits bit(8).                     /* define the bytes & bits */
       5 ds_flag_byte2_bits bit(8).
     3 ds_dflag_bits.
       5 dsdf_t2dup           bit(1).                   /* dup */
       5 dsdf_t2duptlag       bit(1).                   /* dup flag */
       5 dsdf_t2salvage       bit(1).                   /* salvage */
       5 dsdf_t2salvageflag   bit(1).                   /* salvage flag */
       5 dsdf_t2milesunkn     bit(1).                   /* miles unknown */
       5 dsdf_t2mileanp       bit(1).                   /* miles not provided */
       5 dsdf_t2notued1       bit(1).                   /* not used */
       5 dsdf_odo_discrep     bit(1).                   /* odo discrep */
       5 dsdf_dup_discrep     bit(1).                   /* dup title discrep */
       5 dsdf_dup_in60        bit(1).                   /* dup w/i 60 days */
       5 dsdf_notused2        bit(5).                   /* 5 bits- not used */
                                                        /* same as above but for each rec */
  ds_flag1_array(50) bit(8).
  ds_flag2_array(50) bit(8).
  ds_last_title   char(15).
  ds_last_state   char(2).
  ds_last_miles   pic'9999999'.                         /* last title info */
  ds_last_date    pic'999999'.
  ds_stop_date    pic'999999'.                          /* yymmdd stop date (if wanted) */
```

```
DISCREP_SUBR1                              10-JAN-1989 14:06:18    VAX PL/I  V2.3-367              Page 6
V2.3                                        1-DEC-1988 10:08:47    [DEV66.DISCREP]DISCREP_SUBR1.PLI;3  (1)

231   1        /* Read all recs for vin, sort & check */
232   1
233   1           ds_flag_byte1_bits = '00'b4;         /* clear all flag bits */
234   1           ds_flag_byte2_bits = '00'b4;
235   1           ds_1flag_byte1_bits = '00'b4;
236   1           ds_1flag_byte2_bits = '00'b4;
237   1           do i = 1 to ds_rec_count;
238   2              ds_flag1_array(i) = '00'b4;
239   2              ds_flag2_array(i) = '00'b4;
240   2              ds_dealer_array(i) = ' ';
241   2           end;
242   1           ds_last_state = ' ';
243   1           ds_last_title = ' ';
244   1           ds_last_date = 0;
245   1           ds_last_miles = 0;
246   1           prior_odo = 0;                       /* clear odometer check */
247   1           title_counter = 0;
248   1
249   1        check_loop:
250   1           do k = 1 to ds_rec_count;            /* check all transactions */
251   2              j = ds_sort_vector(k);            /* controlled by sort vector */
252   2              if ds_check_array(j) = 'T' then do;  /* check discrep or bypass */
253   3
254   3                 vin_rec = ds_rec_array(j);     /* decode record */
255   3
256   3                 yymmdd = t2date;
257   3
258   3                 if yymmdd < ds_stop_date then do;  /* before stop date? */
259   4                    local_discrep_bits = '00'b4;    /* clear context bit flags */
260   4                    ds_flag1_array(k) = t2status_bit8;  /* copy status byte */
261   4                    ds_flag_byte1_bits = ds_flag_byte1_bits | t2status_bit8;
262   4                    data_odo = t2odo_dec;           /* put in field for debug */
263   4                    char2 = substr(t2tranid,1,2);   /* get state */
264   4
265   4                    if ds_title_array(j) = 'T' then do;  /* For Titles only... */
266   5                       title_counter = title_counter + 1;
267   5                       if t1stat dup then do;          /* check 4 recent dup issue e */
268   6                          days_in_date = (yymmdd_yy * 365) + (yymmdd_mm * 12) +
269   6                                          yymmdd_dd;
270   6                          if (ds_days_today - days_in_date) < 61 then do;
271   7                             dup_in60 = true;
272   7                             dsdf_dup_in60 = true;
273   7                          end;
274   6                       end;
275   5                       if (title_counter > 1) & (char2 = ds_last_state) then do;
276   6                          dup_discrep = true;
277   6                          dsdf_dup_discrep = true;
278   6                       end;
279   5
280   5                       ds_last_state = char2;
281   5                       ds_last_title = t2titleno;
282   5                       ds_last_date = yymmdd;
283   5                       ds_last_miles = data_odo;
284   5                    end;
285   4
286   4                    if data_odo < 199000 then do;     /* unreasonable data */
287   4                       if (k > 1) & (data_odo > 0) then do;  /* ignore embedded 0 miles */
```

```
DISCREP_SUBR1                        10-JAN-1989 14:06:18   VAX PL/I   V2.3-367                        Page 7
V2.3                                  1-DEC-1988 10:08:47   [DEV66.DISCREP]DISCREP_SUBR1.PLI;3      (1)

288   6
289   7           if prior_odo > data_odo then do;        /* odo problem? */
290   7             dadf_odo_discrep = true;
291   7             odo_discrep = true;
292   6           end;
293   6           prior_odo = data_odo - 1000;            /* save for next trans if '0 */
294   5         end;
295   5         else
296   5         if (k = 1) & (data_odo > 0) then          /* 1st time w/ miles */
297   5           prior_odo = data_odo - 1000;
298   4         end;
299   4
300   4         ds_flag2_array(k) = local_discrep_bits;   /* save local discrep */
301   4
302   4                /* check if we now want any dealers  */
303   4                /* (controlled by mask)              */
304   4         if (((ds_mflag_byte1_bits & ds_flag_byte1_bits) '= '00'b4) &
305   5             ((ds_mflag_byte2_bits & ds_flag_byte2_bits) '= '00'b4) &
306   5             (t2dealer '= ' ')) then do;
307   5           dealer_state = substr(t2tran(d.1,1,2);
308   5   /*      pic99999 = t2dealer; */                 /* build dealer */
309   5           dealer_number = t2dealer;               /* number for later use */
310   5           ds_dealer_array(k) = dealer_state_number;
311   4         end;
312   3
313   2       end;
314   2
315   1     end;
316   1
317   1   end discrep_subr1;
```

Having thus described my invention with the detail and particularity required by the Patent Laws, what is claimed and desired to be protected by Letters Patent is set forth in the following claims.

I claim:

1. A computer method for rapidly identifying and displaying discrepancies in vehicle titles comprising the steps of
    (a) at intervals gathering recent title transaction data from a plurality of sources indexed by vehicle identification number, said data from different sources having common and different data elements and being organized differently,
    (b) adding records to a master database having a plurality of transaction standard variable format records indexed by vehicle identification number,
    (c) selecting all records indexed by the same vehicle identification number,
    (d) identifying the discrepancies inherent in the individual transaction records selected,
    (e) identifying the contextual discrepancies which may be determined by comparison of transaction records indexed by the same vehicle identification number, and
    (f) displaying the title transactions and discrepancies, if any, identified in steps (d) and (e).

2. A computer method for rapidly identifying and reporting discrepancies in vehicle titles comprising the steps of
    (a) at intervals gathering recent title transaction data from a plurality of sources including at least state title offices, said data indexed by vehicle identification number, said data from different sources having common and different data elements and being organized differently,
    (b) adding records to a master database having a plurality of variable format transaction records indexed by vehicle identification number, and having unvarying fields for vehicle identification number, source, odometer reading, title type, and transaction date,
    (c) selecting all records indexed by the same vehicle identification number,
    (d) identifying the discrepancies inherent in the individual records selected at least by the content of the title type field,
    (e) identifying the contextual discrepancies which may be determined by comparison of vehicle records indexed by the same vehicle identification number, and
    (f) displaying the title transactions and discrepancies, if any, identified in steps (d) and (e).

3. The method according to claim 2 wherein the odometer fields in all records are compared in step (e) and if an odometer discrepancy is found, indicating a discrepancy in step (f).

4. The method according to claim 2 wherein in step (e) a search is made for a duplicate title source discrepancy and if found indicating a discrepancy in step (f).

5. The method according to claim 2 wherein in step (e) a search is made for duplicated titles issued within a preselected period of time prior to the search, and if found, indicating a discrepancy in step (f).

6. The method according to claim 2 wherein the transaction records assembled in step (b) have an unvarying field comprising a status byte the bits of which are used to store the identification of an inherent title discrepancy detected at the time records are added to the master database.

7. The method according to claim 2 wherein the source field is used to identify the structure of the variable portion of the records in the master database.

8. A computer method for rapidly identifying and displaying discrepancies in vehicle titles comprising the steps of
    (a) at intervals gathering recent title transaction data from a plurality of sources including state title offices indexed by vehicle identification number, said data from different sources having common and different data elements and being organized differently,
    (b) adding records to a single master database having a plurality of variable format transaction records indexed by vehicle identification number, and having unvarying fields for vehicle identification number, source, status, odometer reading, title type, and transaction date, the status field comprising a status byte the bits of which are used to store identification of title discrepancies determinable from the data in the entire record,
    (c) identifying the discrepancies inherent in the individual records at least by the content of the title type field at the time of adding records to the master database and setting the status byte accordingly,
    (d) selecting all records indexed by the same vehicle identification number and storing them in a record array and sorting the array by the transaction date field,
    (e) identifying the contextual discrepancies which may be determined by comparison of vehicle records indexed by the same vehicle identification number by comparing each record in the array with the preceding record, and
    (f) displaying title transactions and discrepancies, if any, identified in steps (c) and (e).

9. The method according to claim 8 wherein the odometer fields in all records are compared in step (e) and if a odometer reading for a later transaction is less than for an earlier transaction, indicating a discrepancy in step (f).

10. The method according to claim 8 wherein in step (e) a search is made for a duplicate title source and the immediate prior title source not the same and if found, indicating a discrepancy in step (f).

11. The method according to claim 8 wherein in step (e) a search is made for duplicated titles issued within a preselected period of time prior to the search, and if found indicating a discrepancy in step (f).

12. The method according to claim 8 wherein the bits in the status byte are indicative of at least one inherent discrepancy selected from the group, duplicate title issued, prior duplicate title issued, salvage title issued, prior salvage title issued, miles unknown, and miles not provided.

13. The method according to claim 8 wherein as part of step (e) a two-byte status word is built, the first byte of the status word being a the logical OR of all status bytes in the record array and the second byte of the status word comprising bits which are used to store identification of contextual title discrepancies determined for any record comparison in step (e).

14. The method according to claim 13 wherein the bits in the first byte of the status word are indicative of at least one inherent discrepancy selected from the group, duplicate title issued, prior duplicate title issued, salvage title issued, prior salvage title issued, miles unknown, and miles not provided and wherein the bits in the second byte of the status word are indicative of at least one of the contextual discrepancies selected from the group, odometer discrepancy, duplicated title discrepancy and duplicate title within preselected time period.

15. The method according to claims 13 or 14 wherein the status word is used in step (f) to control the display of discrepancy messages being displayed.

16. The method according to claim 13 wherein in step (e) a formatted record array in constructed from the sorted record array to provide an array of printable transaction records, and at least one array of status bytes is constructed from the status byte fields of the sorted record array and a second status byte wherein each bit stores information on contextual discrepancies found by each comparison in step (e).

17. The method according to claim 16 wherein in step (f) each title transaction is printed from the formatted array with an indicia of discrepancy if a discrepancy is indicated by the bits in the at least one array of status bytes.

* * * * *

UNITED STATES PATENT AND TRADEMARK OFFICE
CERTIFICATE OF CORRECTION

PATENT NO. : 4,989,144

DATED : January 29, 1991

INVENTOR : Ewin H. Barnett, III

It is certified that error appears in the above-identified patent and that said Letters Patent is hereby corrected as shown below:

Column 8 Line 14 "principal" should read --principle--.

Column 8 Line 53 "odometer mileage" should read --odometer reading--.

Claim 13 Line 61 Column 24 after "being" delete --a--.

Claim 16 Line 13 Column 25 "in" should read --is--.

Signed and Sealed this

First Day of September, 1992

Attest:

DOUGLAS B. COMER

Attesting Officer

Acting Commissioner of Patents and Trademarks